United States Patent [19]

Nunez et al.

[11] Patent Number: 5,236,672
[45] Date of Patent: Aug. 17, 1993

[54] CORONA DESTRUCTION OF VOLATILE ORGANIC COMPOUNDS AND TOXICS

[75] Inventors: Carlos M. Nunez, Durham; Geddes H. Ramsey, Chapel Hill; Wade H. Ponder, Raleigh; James H. Abbott, Cary, all of N.C.

[73] Assignee: The United States of America as represented by the United States Environmental Protection Agency, Washington, D.C.

[21] Appl. No.: 809,792

[22] Filed: Dec. 18, 1991

[51] Int. Cl.$^5$ ............................................. B01J 19/12
[52] U.S. Cl. .................................. 422/186.04; 422/186
[58] Field of Search .............. 422/186, 186.04, 186.07, 422/186.18, 186.19

[56] References Cited

U.S. PATENT DOCUMENTS

| | | | |
|---|---|---|---|
| 2,822,327 | 2/1958 | Hammesfahr et al. | 422/186 |
| 3,899,682 | 8/1975 | Lowther | 250/532 |
| 4,461,744 | 7/1984 | Erni et al. | 422/186.18 |
| 4,650,648 | 3/1987 | Beer | 422/186.07 |
| 4,690,803 | 9/1987 | Hirth | 422/186.18 |
| 4,818,355 | 4/1989 | Kanter et al. | 204/170 |
| 4,877,588 | 10/1989 | Ditzler et al. | 422/186.19 |
| 4,882,129 | 11/1989 | Andrews et al. | 422/186.2 |
| 4,886,645 | 12/1989 | Fischer et al. | 422/186.18 |
| 4,892,713 | 1/1990 | Newman | 422/186.07 |
| 4,908,189 | 3/1990 | Staubach | 422/186.19 |
| 4,954,320 | 9/1990 | Birmingham et al. | 422/186.04 |
| 4,960,569 | 10/1990 | Fovell et al. | 422/186.19 |
| 4,970,056 | 11/1990 | Wooten et al. | 422/186.07 |
| 5,002,738 | 3/1991 | Pin et al. | 422/186.13 |
| 5,002,739 | 3/1991 | Ditzler et al. | 422/186.19 |
| 5,052,382 | 10/1991 | Wainwright | 128/202.25 |
| 5,061,462 | 10/1991 | Suzuki | 422/186.04 |

*Primary Examiner*—Donald P. Walsh
*Assistant Examiner*—Daniel J. Jenkins
*Attorney, Agent, or Firm*—Irving M. Freedman

[57] ABSTRACT

Apparatus and method for controlling volatile organic compounds and air toxics in a contaminated fluid flow through use of an excited species flow generated and introduced into the contaminated fluid flow to convert the contaminants into non-toxic compounds. Tungsten electrodes and an alternating current are used in the excited species generator.

17 Claims, 2 Drawing Sheets

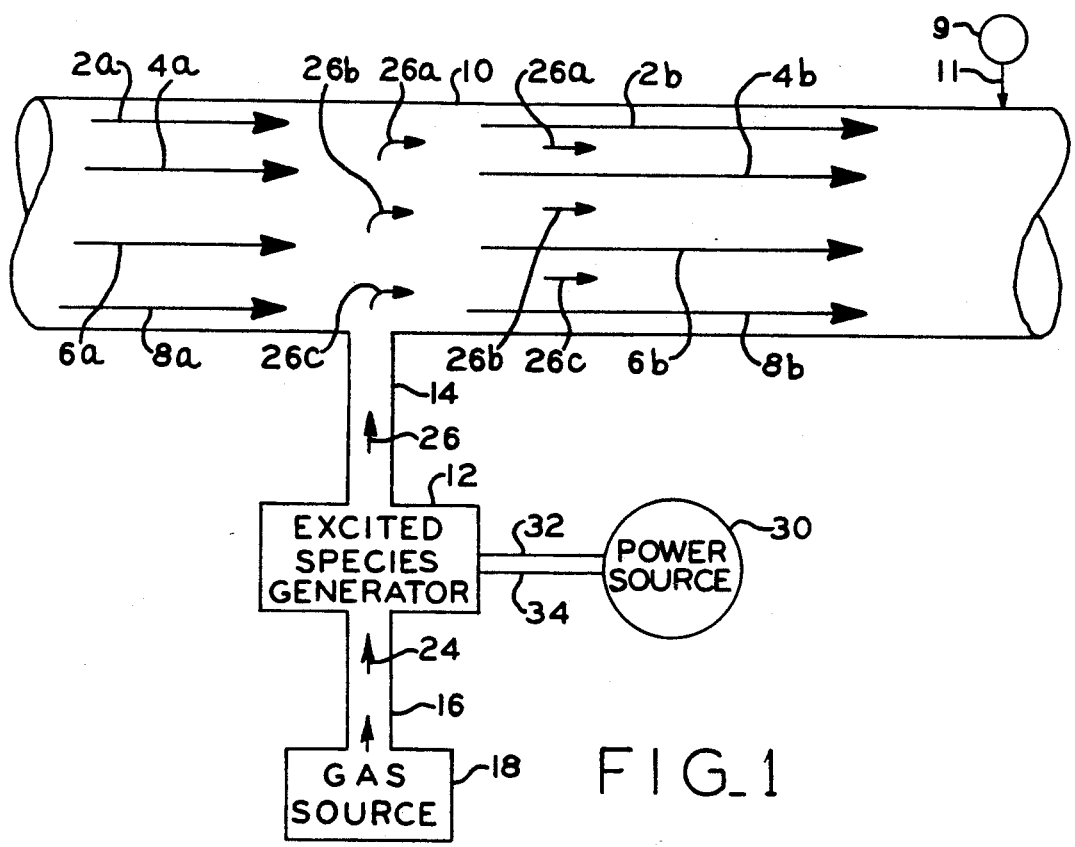
FIG_1
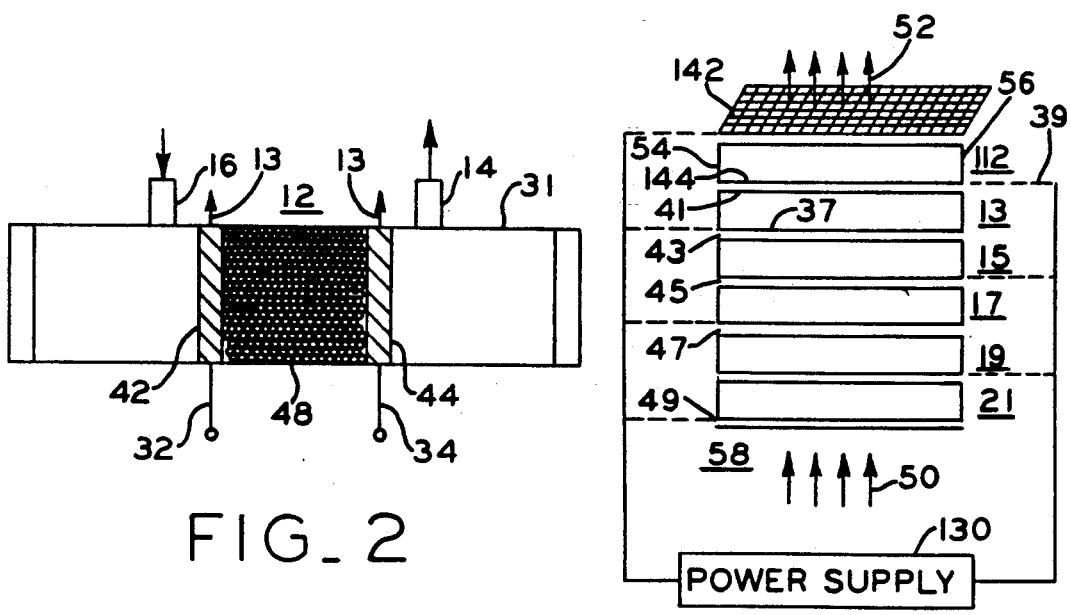
FIG_2
FIG_3

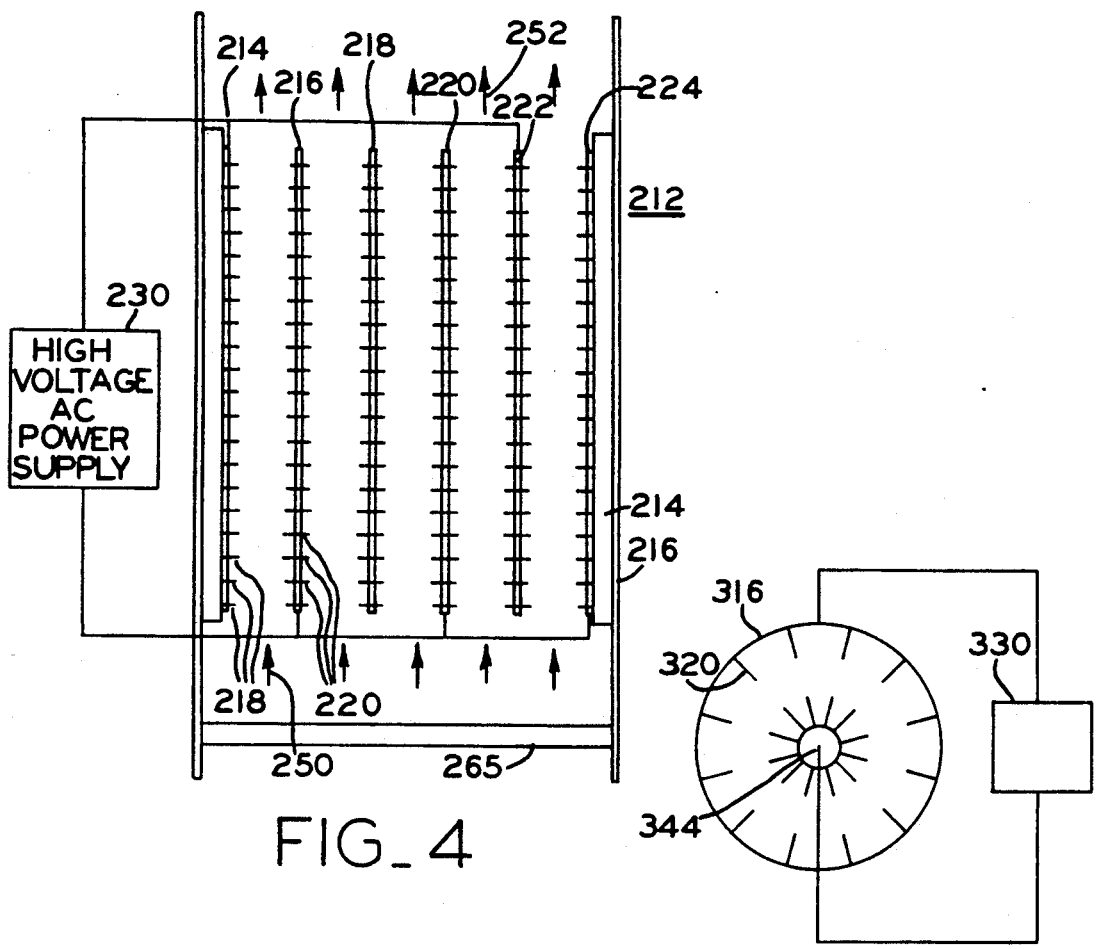
FIG_4
FIG_5
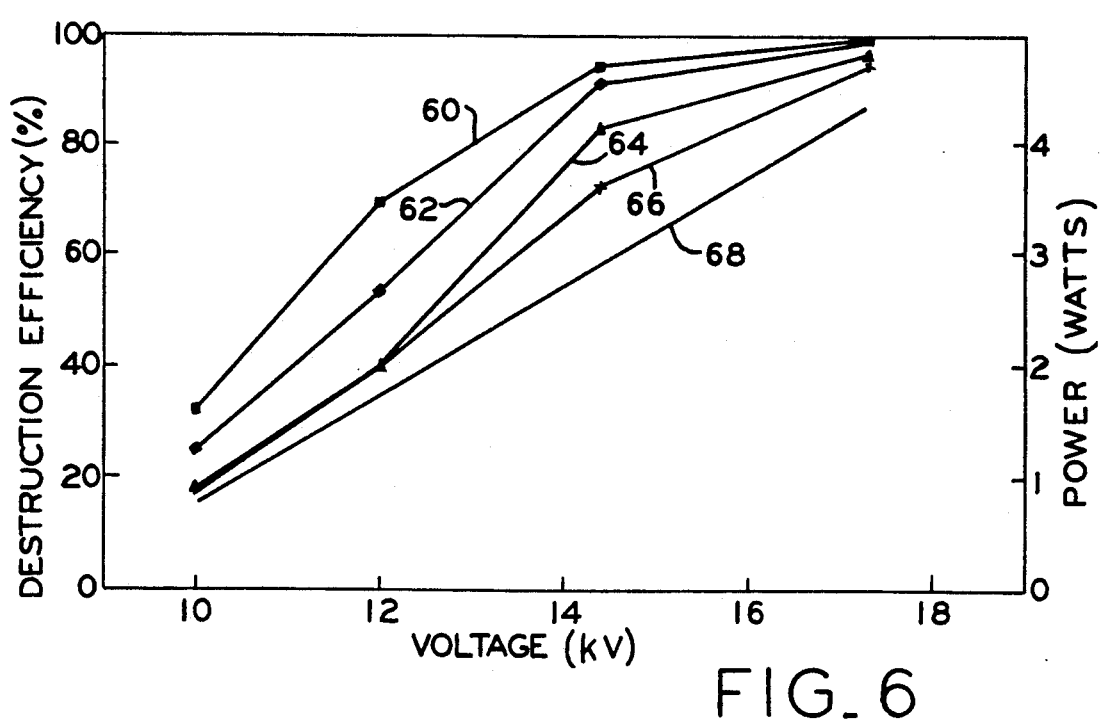
FIG_6

CORONA DESTRUCTION OF VOLATILE ORGANIC COMPOUNDS AND TOXICS

BACKGROUND OF INVENTION

In recent years, extensive concern has been directed at the presence of pollutants and contaminants in air and water. Various studies confirm the hazards to humans of such contaminants, and recent legislation has set stricter controls and regulations concerning, for example, the emission of contaminants into the atmosphere. These regulations, for the most part, are directed at rigidly controlling the concentration of the pollution within specified limits. The economic impact of meeting such regulations has been severe, and, in many cases, difficult or impossible with existing production or processing equipment.

Available methods of eliminating air toxics and volatile organic compounds (VOCs) are extremely expensive, particularly when the VOCs and air toxics are present in low concentrations. Thermal incineration is relatively difficult and expensive. While catalytic incineration does not require temperatures as high as thermal incineration, its performance is substantially degraded and unsatisfactory when applied to emission streams of low concentrations. Another method for treating air toxics and VOCs is through adsorption, utilizing a material such as activated carbon. After adsorption over a period of time, the VOCs and air toxics can be desorbed at a higher concentration through regeneration of the sorbent. However, while this procedure may effectively collect VOCs and air toxics, subsequent disposal of the adsorbed toxic components still presents problems. Other methods such as the use of ozone as an oxidizing agent are known and used, as is exposing a contaminated gaseous stream to ultraviolet light in the presence of oxygen and/or ozone such as taught, for example, in U.S. Pat. No. 4,045,316.

While the methods described above can be used in the control or destruction of VOCs and air toxics, they are particularly inefficient and costly where the VOCs and air toxics (hereinafter referred to as contaminants) are present in low concentrations. Low concentrations of contaminants make it inefficient and/or impractical to treat the large fluid volume involved in a reaction chamber as in the aforesaid U.S. Pat. No. 4,045,316 because the volumetric requirements for such reaction chambers become extremely large.

As a result, the problem of effectively treating or controlling contaminants in fluids, particularly where the concentration of the contaminants is low has not been satisfactorily solved by existing methods and apparatus. Moreover, in addition to the need for a low-cost and effective method of controlling contaminants in fluids, it is highly desirable that such a method be applicable to existing production equipment, production processes and waste incinerators since it has become necessary to retrofit and modify such existing equipment to meet the more demanding and stringent governmental regulations such as Titles I and III of the 1990 Clean Air Act Amendments. Moreover, it is important to minimize the amount of power required to control such contaminants, not only from a cost-effective point of view, but also because the generation of electric power frequently involves the burning of fossil fuels which leads to further emissions of contaminants into the atmosphere with the problem of controlling those contaminant emissions. Still further, it is important to avoid the generation of toxic materials by the control equipment such as results from the use of an adsorption process. That is, it is desirable that the contaminants be transformed or broken down into non-toxic compound and materials which can be readily disposed of.

OBJECTS AND SUMMARY OF INVENTION

It is an object of the present invention to provide a process and apparatus to remove contaminants such as VOCs and air toxics from fluids.

It is another object of the present invention to provide a process and apparatus to control contaminants in fluids which is efficient from a cost and energy viewpoint.

It is still another object of the present invention to provide a process and apparatus to control contaminants in fluids which may be readily added to existing equipment.

It is yet another object of the present invention to provide a process and apparatus to remove contaminants from fluids by converting them to non-toxic compounds and materials.

It is a further object of the present invention to provide a process and apparatus to efficiently remove contaminants from fluids even though the levels of concentration of contaminants is low.

With the aforesaid objects in view, the subject invention includes the injection of a stream of activated oxygen or other activated species into a fluid stream to transform volatile organic compounds and air toxics into non-toxic compounds. The stream of excited species is provided by an excited species generator and combined with the contaminated fluid flow to react with the contaminants and transform them into harmless compounds. Particularly, the excited species generator includes electrodes between which oxygen-containing gas is passed in order to excite the oxygen. The electrodes, in a preferred embodiment are constructed of tungsten and, in another embodiment, a dielectric of barium titanate is positioned between a pair of electrodes to form a cell which may be placed in series with similar cells to increase the level of the excited species and the effectiveness of the system.

BRIEF DESCRIPTION OF DRAWINGS

FIG. 1 is a simplified block diagram of a preferred embodiment of the present invention.

FIG. 2 shows the details of one form of an excited species generator of FIG. 1.

FIGS. 3, 4 and 5 are alternate embodiments of the excited species generator of FIG. 2.

FIG. 6 is a plot of the destruction efficiency and the power requirements of one embodiment of the invention plotted against electrode voltage.

Referring first to FIG. 1, a contaminated flow 2, 4, 6, and 8 shown by arrows, 2A, 4A, 6A and 8A and 2B, 4B, 6B and 8B passes within the conduit 10. The contaminated fluid flow 2, 4, 6, and 8 may be any contaminated flow including volatile organic toxics and noxic and toxic emissions such as methane, methylene chloride, hexane, cyclohexane, toluene, MEK, formaldehyde, xylenes and $NO_x$. The conduit 10 may be any normal or existing piping or chamber within an industrial process or waste incinerator, including existing systems and apparatus. In accordance with the present invention, an excited species generator 12 is connected via line or pipe 14 to the conduit 10. The input 16 of the excited species generator 12 is connected to a gas source 18. As described in more detail below, the gas source 18 provides an oxygen-containing gas such as air or oxygen 24 to the excited species generator 12 which then provides the excited oxygen 26 to the interior of the conduit 10 where the relatively small flow as is illustrated by small arrows 26a, 26b and 26c mixes with the larger flow of contaminated fluid flow 2,4,6, and 8. The excited species 26 oxidizes the volatile organic compounds (VOCs) and air toxics to carbon dioxide, carbon monoxide and water and, in the case of chlorinated compounds, such as methylene chloride, to chlorine and hydrochloric acid. As such, the contaminants are destroyed, along with any problem of disposing of toxins if other collection methods discussed above are used.

It is to be noted that the excited species 26 is mixed with the contaminated flow 2, 4, 6 and 8 in the existing conduit 10 of the industrial process or waste incinerator to which the invention is applied. There is no need for a separate or additional reaction chamber to treat the mixture after or during the mixing such that the subject invention is very advantageous in the destruction of VOCs and toxic emissions in that the cost is reduced particularly where the contaminant concentration is low. Electric power is provided from the power source 30, via conductors 32 and 34, to the excited species generator 12, which is described in more detail below in connection with FIGS. 2-5.

Referring next to FIG. 2. FIG. 2 shows a preferred embodiment of the excited species generator 12 comprising a chamber 31 containing a pair of electrodes 42 and 44. The electrodes 42 and 44 are fabricated of tungsten and constitute essentially parallel plates with the region between them packed with a dielectic, preferably barium titanate pellets or packed bed 48. The zero air or pure oxygen, the input gas 24, is provided by the gas source 18 (see FIG. 1) is applied through the inlet pipe 16 to the excited species generator 12 to pass through the barium titanate bed 48, where it is subjected to the high voltage provided across the electrodes 42 and 44. The input gas 24 is converted to a excited species which is then fed through the outlet pipe 14 to the conduit 10. The high dielectric, barium titanate pellets of the packed bed 48, enable the application of a high voltage across electrodes 42 and 44 without arcing or sparking between the electrodes. We have found that the ability to provide a high voltage across electrodes 42 and 44 without arcing, and the efficiency of the present invention, is improved through use of tungsten for the electrodes. We have not been able to satisfactorily explain the reason for this improved application.

The application of a high AC voltage to the electrodes 42 and 44 from power source 30 (see FIG. 1) via electrical lines 32 and 34 develops micro-electric fields in the interstitial spaces between the pellets 48 and forms a multiplicity of corona sites which generate electrons which initiate the reactions that lead to destruction of the contaminants in the contaminated flow 2, 4, 6 and 8. The invention has been tested and found to be effective in destroying VOCs and air toxics such as toluene, benzene, hexane, styrene, cyclohexane, methylene chloride, methylethylketone and methane. Test results indicate that a relationship exists between the ionization potential of the contaminants and their ease of destruction; the lower the ionization potential, the easier the compounds are destroyed.

The corona processes of the present invention operate at ambient temperature, eliminating the need for the relatively high power which is required for systems which operate at elevated temperatures. One apparent effect of temperature is on gas density, which increases the mean free path of the electrons which may improve the destruction slightly. The process avoids any need to heat the contaminated air streams or fluid streams 2, 4, 6 and 8 to the temperature necessary for a catalyst to work or for thermal incineration. In fact, it has been found that increased temperature can require a higher voltage to electrodes 42 and 44 from power source 30 to maintain effectiveness. This may be due to increased impedance to current flow between the electrodes 42 and 44, requiring increased voltage to maintain a steady current. We have found that utilizing hollow electrodes 42 and 44 with air or other coolant flow through the electrodes shown by arrow 13 will extract heat and cool the electrodes and packed bed 48 enabling the use of a lower voltage from power source 30. As noted above, the various compounds which have been tested have been oxidized to carbon dioxide, carbon monoxide and water, plus, in the case of chlorinated compounds, chlorine and hydrochloric acid. No intermediate compounds have been found in the exhaust stream, such that the compounds produced are not considered toxic and the problem of disposing of collected toxic compounds is avoided.

Also of significance is that the present invention has proven effective to destroy very low concentrations of contaminants in fluid flow. For example, contaminant streams of only 10 parts per million of single component VOCs in air were destroyed beyond the detection limit of the analytical equipment at the laboratories of the U.S. Environmental Protection Agency. The present invention is thus an advantageous alternative for low concentrations of contaminants as compared with conventional control devices such as catalytic incineration and carbon absorption which exhibit the economic and-/or technical disadvantages described above. Our estimates for the present invention indicate that the power requirement for VOC destruction is approximately 3 watts/ft$^3$ (106 joules/sec/m$^3$). These calculations indicate that the annual operating costs of corona destruction utilizing the present invention would fall well below the cost of equivalent catalytic incineration and thermal incineration. As a result, the present invention is particularly attractive and well-suited to destroy contaminants (VOCs and air toxics) in the outlet stream of industrial processes such as painting and coating operations, food and pharmaceutical processing, site remediation, dry cleaning, printing, restaurants and bakeries.

Corona destruction is the result of the accelerated electrons which excite the molecules with low energy levels. These molecules then attack contaminants such as VOCs to form carbon dioxide and water. The present invention is thus applicable to reducing emissions of volatile organic compounds which contribute to the formation of ground level ozone, where such reduction is required, for example, to meet Title I of the 1990 Clean Air Act and to control air toxics and low concentration VOCs as required by Title III of the 1990 Amendments to the Clean Air Act.

In an alternate preferred embodiment of the invention, the tungsten electrodes were utilized without the packed bed dielectric such as the barium titanate pellets 48 of FIG. 2.

FIG. 3 illustrates details of an alternate embodiment of an excited species generator. As shown in FIG. 3, the excited species generator 12 includes electrodes 142 and 144 which are fabricated in the form of a grid as best shown by electrode 142 to enable input gas flow indicated by arrows 50 and upward gas flow indicated by arrows 52. To increase the destruction efficiency, particularly in the presence of rapid flow rates, the excited species generator 112 may be connected in series with similar generators such as those shown generally as 13, 15, 17, 19 and 21. That is, the excited species generators may be physically juxtaposed so that the input gas 50 flows sequentially through the excited species generators 21, 19, 17, 15, 13 and 112 before exiting as the output gas flow 52. Moreover, power supply connections can be minimized by connecting adjacent electrodes of each excited species generator which are in contact with one another to the same side of the power supply. That is, electrode 44 of excited species generator 112 in contact with electrode 41 of excited species generator 13 is connected by a common connection 39 to the same side of power supply 30, while electrode 37 of generator 13 is connected to the opposite side of the power supply along with the adjacent electrode of generator 15. Adjacent electrodes of adjacent excited species generators 15, 17, 19 and 21 are similarly connected to alternate sides of power supply 130.

It is to be appreciated that, while the input gas flow 50 may be the oxygen containing gas 24 of FIG. 1 and the excited species generator 12 of FIG. 1 may be replaced by the battery of excited species generators 12, 13, 15, 17, 19 and 21 of FIG. 3, the battery 58, including the series-connected excited species generators, may be directly applied to control a contaminated gas for purification of that gas flow. That is, the input gas flow 50 may be a contaminated gas flow with the battery 58 used to directly purify the contaminated gas flow. As such, the battery 58 could be inserted directly into a conduit carrying a contaminated gas such as conduit 10 in FIG. 1.

A further embodiment of an excited species generator is shown in FIG. 4. Referring to FIG. 4, the excited species generator 212 includes a plurality of spaced electrodes 214, 216, 218, 220, 222 and 224, having alternating electrodes connected to opposite sides of the high voltage AC power supply 230. That is, as shown in FIG. 4, the electrodes 214, 218 and 222 are connected to one side 215 of the power supply 230, while the intermediate alternate electrodes 216, 220 and 224 are connected to the opposite side 217 of the power supply 230. The input gas flow indicated by arrows 250 is directed between the electrodes; that is, in the same direction that the electrodes extend, rather than transverse to the electrodes, as in the excited species generators 112, 13, 15, 17, 19 and 21 of FIG. 4. The outermost electrodes 214 and 224 are spaced from and supported on the tubular housing 216 by the annular insulator 214 positioned within the tubular housing. The electrodes 214, 216, 218, 220, 222 and 224 are fabricated of a metal, which may be tungsten with a plurality of tungsten projections such as 218 and 220 extending vertically into, and across the flow path of the input gas flow 50, through the excited species generator 212. Thus the tungsten projections such as 218 and 220 extend into, and transverse to, the gas flow path.

The excited species generator 212 of FIG. 4 provides an effective corona discharge without the pressure drop which would be associated with a high dielectric material pellet packed bed, such as shown in FIG. 2, and without the relatively high power consumption required for a pulsed reactor system. The excited species generator 212 has proven to be effective in the destruction of a broad range of both halogenated and non-halogenated hydrocarbon air pollutants, in the control of volatile organic compounds (VOCs) and in the control of the ambient levels of ozone. It is also effective in directly controlling a contaminated gas, particularly at low levels, such that the contaminated gas may constitute the input gas flow 250 with the excited species generator 212 delivering clean air as the output gas flow 252. Alternatively, the excited species generator 212 could be used as the generator 12 in the system of FIG. 1, in which a gas source 18 provides a small gas flow which is excited for mixing with a much larger flow of contaminated gas or fluid 2, 4, 6 and 8 of FIG. 1.

It is not necessary that the plates forming the electrodes 214, 216, 218, 220, 222 and 224 in FIG. 4 be of tungsten. They could be of another material or metal such as stainless steel, with the tungsten projections affixed to or projecting through the planar electrodes.

FIG. 6 shows a plot of the destruction efficiency in percent of toluene and power consumed in watts on the Y-axis plotted against the voltage in kilovolts applied to the electrodes, as plotted on the X-axis. The various plots show different flow rates. Plot 60 represents a flow rate of 0.75 liters per minute, while plot 62 represents 0.90 liters per minute. Plot 64 represents a flow rate of 1.08 liters per minute, while plot 66 represents the destruction efficiency at 1.30 liters per minute. As can be ascertained from FIG. 6, the destruction efficiency is increased when a greater voltage is applied to the electrodes 42 and 44 (see FIG. 2) and increases rather rapidly in the range between 10 to 14 kilovolts, where it approaches some 65 to 85% destruction efficiency, and then levels off to reach almost complete destruction efficiency at approximately 17 kilovolts. FIG. 6 also illustrates that the higher the flow rate, the greater the voltage required on the electrodes to maintain a given efficiency. This is a function of the residence time during which the excited species can react with the contaminants in the contaminated fluid. Since the half-life of ground level atomic oxygen is about 10 seconds, and the destruction of the organic compounds comprising the VOCs and air toxics continues during the intermingling of the gases, the flow rate does not as directly affect the destruction efficiency as the voltage. FIG. 6 also illustrates that with increased voltage applied to the electrodes 42 and 44, the system consumes increased power with the power consumption, however, being relatively low, and with the equipment achieving essentially complete destruction with slightly in excess of 4 watts. That is, the present invention operates at relatively low power consumption.

FIG. 6 helps illustrate the necessity to provide a design which enables adequate voltage to be applied across electrodes 42 and 44 without arcing or sparking. Increased voltage increases the destructive efficiency. However, arcing or sparking consumes power and prevents proper and/or efficient operation of the excited species generator 12. The use of tungsten electrodes has unexpectedly enabled the use of the appropriate voltages without arcing between the electrodes, or other improper operation of the invention.

The various embodiments of the present invention have proven effective, both from a technical and an economic viewpoint, of destroying or controlling VOCs and air toxics by producing non-toxic compounds such as $CO_2$ and water.

An alternate embodiment to the excited species generator 212 shown in FIG. 4, is shown in FIG. 5. Referring to FIG. 5, the tubular electrode or housing 316 is fabricated from conducting material such as metal while a rod or tubular tungsten electrode 344 extends along, and substantially parallel to, the axis of the tubular housing. A plurality of tungsten projections such as 318 and 320 are spaced along and perpendicular to the electrodes 344 and 316 such that they extend transverse to the flow of contaminated fluid through the region between the electrodes.

A rod electrode 344 would be appropriate in combination with a direct current (DC) power supply 330. However, a more effective arrangement for use with an alternating current (AC) power supply would be a tubular electrode 344 having a surface in close proximity to the concentric tubular electrode 316. In an alternate embodiment of the present invention, a plurality of concentric tubular electrodes may be positioned between electrodes 316 and 344 with alternate electrodes being connected to the same side of the power supply 330 similar to the connection arrangement of the planar electrodes shown in FIG. 4. As a result the contaminated air flow between any pair of adjacent concentric electrodes would operate in the same manner as the single pair of electrodes 316 and 344.

The tungsten electrodes in the various embodiments or the excited species generator such as those shown in FIGS. 2, 3, and 4 act as electron emitters, and the electrons activate the oxygen molecules in the gas flow (such as 250 in FIG. 2) to provide enough energy to cause a reaction with the contaminant molecules. In the reaction, the contaminant molecules are reduced to their basic compounds which are non-toxic and as a result can be readily disposed of. The tungsten may be thoriated or cesiated tungsten in order to increase the level of excited species available for the reaction.

In an alternate embodiment of the invention, a carbon absorber 265 may be placed in series with the excited species generator such that the contaminated airflow 250 passes through the carbon absorber 265 prior to reaching the excited species generator such as 212 in FIG. 4. The carbon absorber 365 may be activated charcoal and can be useful in removing large amounts of contaminants in order to even out the concentration of the contaminants to be presented to, and handled by, the excited species generator 212. Similarly, other contaminant control devices may be used in combination with the excited species generators of the present invention. For example, an electrostatic precipitation 9 may be positioned as shown by the arrows 11 in FIG. 1. The excited species generator 12 causes charged particles in the flow 2, 4, 6, 8 and 26, and an additional or separate charging device need not be provided for, or with, the electrostatic precipitator. Charged particulate matter in the flow 2, 4, 6, 8, and 26 may be collected by the electrostatic precipitator 9 and removed from the flow.

It has been found desirable that the power source 30 of FIG. 1, 130 of FIG. 3, and 230 of FIG. 4 be alternating current power sources which assists in keeping electrons suspended between electrodes to facilitate the conversion of the VOCs and air toxics to non-toxic compounds. A frequency in the range of 50 hertz to 10 kilohertz has proved to be effective. The applied voltage may be single phase or polyphase. It is possible to vary the voltage of power source 30 (see FIG. 2) in order to maintain the pollutants and contaminants in flow 2b, 4b, 6b and 8b below a predetermined level. That level, for example, may be at what is considered a safe level for the environment involved or a level to insure compliance with governmental standards or regulations. To accomplish this the power source 30 contains a microprocessor based voltage control system and a sensor positioned as shown by arrow 11 to sense pollutant and contaminant levels and provide a control signal to the microprocessor based voltage control system of power source 30. If the level of pollutants and contaminants in flow 2b, 4b, 6b and 8b rose, the voltage provided to the electrodes of the excited species generator 12 would be increased to increase the power input to, and current provided by, the excited species generator 30 to lower the level.

One important advantage of the present invention is that unlike systems which require the application of the corona or the energization of the entire contaminated gas supply in a reaction chamber, the system of FIG. 1. utilizes a relatively small gas flow from gas source 18 to be excited in the excited species generator 12 for subsequent mixing with the much larger contaminated gas flow to 2, 4, 6 and 8 in the conduit 10. The mixing of the excited species with the contaminated gas takes place in the existing or required piping or ducting of the industrial process such as an exhaust duct carrying the pollutant stream away from the process. Since the excited species generator 12 only handles a small flow as compared to the contaminated gas flow, the size of the generator can be considerably reduced compared to a control device treating the entire stream flow, and there is no need for a large reaction chamber such as is shown and required in the aforesaid U.S. Pat. No. 4,045,316.

The fluid flow 2, 4, 6 and 8 of FIG. 1 can be either a gas or a liquid. That is, if the fluid flow 2, 4, 6 and 8 is a liquid, the gas source 18 would provide a gas flow which would be converted to an excited species flow by the excited species generator 12, which would then flow through the liquid flow in a gas-stripping action. The gas flow through the liquid in the conduit 10 would combine with, and convert, the contaminants in the liquid flow in the manner similar to that explained above.

The addition of other excited species such as hydroxyl radicals, singlet oxygen, or ozone may be utilized to enhance the destruction of certain compounds such as halogenated hydrocarbons, CFCs and chemical warfare agents. A microprocessor may be utilized to control the gas flow from the excited species generator such as 12 in FIG. 1. If the excited species generator 12 of FIG. 1 is used to destroy halogenated compounds in this manner, a non-electric bed shown as 9 in FIG. 1, may be inserted at the down stream end of the conduit 10 at a location indicated generally by arrow 11 to remove any free halogens or acids formed in the process. The non-electrified bed 9 may be an absorption bed, a catalytic bed, or a combination of the two. A scrubber may be provided to collect HCl and $Cl_2$ from halogenated hydrocarbons. The present invention is thus applicable to numerous and varied processes or equipment which generate VOCs or air toxics. For example, the excited species from an excited species generator may be provided to the secondary chambers of wood burning stoves which include such chambers, or to the emission stack of wood burning stoves to enhance the destruction of hydrocarbons and lower the carbon monoxide emissions. The addition of excited species may improve the efficiency of the secondary chamber and eliminate the need for a catalyst as a control agent.

The structure of the present invention is such that it is relatively simple to connect multiple batteries of excited species generators in series, in parallel, or in a series-parallel combination to increase the capacity and/or effectiveness of the control of VOCs and toxics.

While the present invention has been described with respect to certain preferred embodiments thereof, it is to be understood that numerous additional variations in the details of construction, the arrangements and combination of parts, and the type of materials used may be made without departing from the spirit and scope of the invention.

What we claim is:

1. A method capable of controlling low levels of volatile organic compounds (VOCs) and toxics such as toluene, methane, hexane, benzene, halogenated toxics and ozone in a contaminated fluid flow and capable of operation at ambient temperatures comprising:
    passing said contaminated fluid flow through a conduit;
    passing a carrier gas through an excited species generator including at least one pair of electrodes forming a space therebetween with barium titanate pellets forming a packed bed in said space and with said carrier gas passing through said packed bed and between said pellets;
    connecting the output of said excited species generator to said conduit;
    applying electrical power to said excited species generator to generate an excited species flow in said carrier gas;
    introducing said excited species flow in said carrier gas after passing through said excited species generator into the contaminated fluid flow to combine said excited species carrier gas flow and said contaminated fluid flow;
    converting said VOCs and toxics into non-toxic compounds; and
    disposing of said non-toxic compounds.

2. The method of controlling VOCs and toxics in a contaminated fluid flow of claim 1 wherein said excited species generator includes tungsten electrodes of substantially the same size and wherein said electrodes are tungsten and said applying electrical power includes the application of alternating current power, and wherein the amount of electrical power required for the conversion of said toxics is reduced through the use of said tungsten and barium titanate packed bed in said excited species generator.

3. The method of controlling VOCs and toxics in a contaminated fluid flow of claim 2 wherein said excited species generator includes a plurality of cells each including a pair of electrodes and packed bed with the packed bed positioned transverse to the flow of said carrier gas, and the additional step of connecting alternate pairs of adjacent electrodes to the same side of said electrical power.

4. The method of controlling VOCs and toxics in a contaminated fluid flow of claim 1 wherein a gas source including oxygen is provided as said carrier gas.

5. The method of controlling VOCs and toxics in a contaminated fluid flow of claim 1 wherein said fluid is a liquid and said excited species generator introduces a gas flow into said liquid for gas stripping of said VOCs and toxics.

6. The method of controlling VOCs and toxics in a contaminant fluid flow of claim 1 including the additional step of passing said flow containing said contaminated VOCs and toxics after introduction of said excited species flow past an electrostatic precipitator to remove particles charged by said excited species flow.

7. The method of controlling VOCs and toxics in a contaminated fluid flow of claim 1 wherein said electrical power applies a voltage to said electrodes and said voltage is varied in response to changes in the level of said VOCs and toxics.

8. The method of controlling VOCs and toxics in a contaminated fluid flow of claim 2 wherein said alternating current is a high frequency alternating current.

9. Apparatus to control volatile organic compounds (VOCs) and toxics in a contaminated fluid flow comprising:
    at least one pair of electrodes of substantially the same surface area forming a space therebetween;
    a packed bed of barium titanate pellets positioned in said space;
    means to pass a gas flow through said packed bed and between said pellets;
    an alternating current source connected to produce a high voltage electric field across said electrodes and said pellets to develop electric fields between said pellets of sufficient magnitude to excite said gas flow to produce an excited species flow for reaction between said excited species and said contaminated fluid flow;
    to convert said VOCs and toxics to non-toxic compounds.

10. The apparatus to control VOCs and toxics of claim 9 wherein said at least one pair of electrodes are a multiplicity of pairs of parallel electrodes with each pair of substantially the same size and positioned such that said excited species gas flow passes sequentially between the packed bed of each pair of electrodes.

11. Apparatus to control volatile organic compounds and toxics in a contaminated fluid of claim 9 wherein a particulate collector is positioned to collect particles within the mixture of said excited species flow and said contaminated fluid flow.

12. Apparatus to control volatile organic compounds and toxics in a contaminated fluid of claim 11 wherein said particulate collector is an electrostatic precipitator.

13. Apparatus to control volatile organic compounds and toxics in a contaminated fluid of claim 9 wherein said excited species flow includes a scrubber to collect contaminants selected from the group consisting of halogenated hydrocarbons, CFCs and other chemicals agents.

14. Apparatus to control volatile organic compounds and toxics in a contaminated fluid of claim 13 wherein a non-electrified bed is positioned to collect particles within the mixture of said excited species flow and said contaminant fluid flow.

15. Apparatus to control volatile organic compounds and toxics in a contaminated fluid of claim 9 wherein said contaminated fluid flow is the combustion gases from wood burning stoves.

16. Apparatus to control volatile organic compounds and toxics in a contaminated fluid of claim 9 wherein one or more of said electrodes are hollow and further including a coolant flow through one or more of the hollow electrodes.

17. Apparatus to control volatile organic compounds and toxics in a contaminated fluid of claim 9 wherein the magnitude of said high voltage is varied in response in response to variations in the level of said VOCs and toxics.

* * * * *